Figure 7:
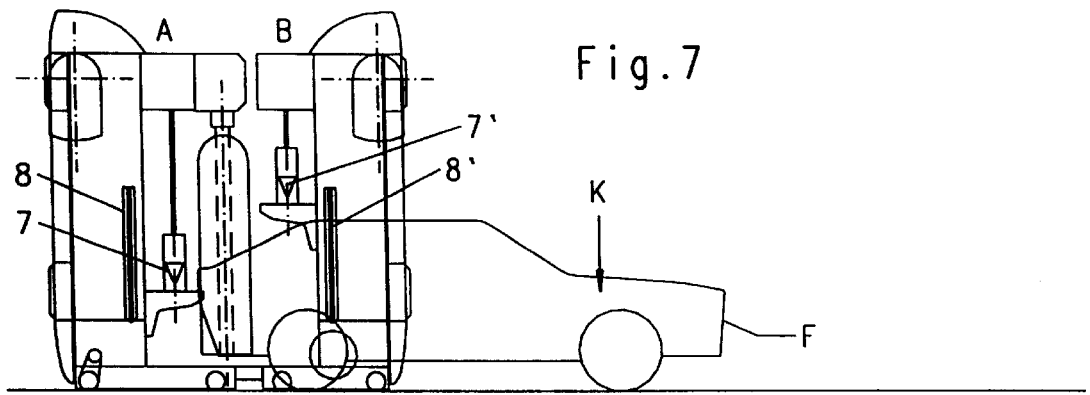

United States Patent [19]
Decker

[11] Patent Number: 6,145,146
[45] Date of Patent: Nov. 14, 2000

[54] GANTRY-TYPE WASHING INSTALLATION FOR WASHING MOTOR VEHICLE

[75] Inventor: Wolfgang Decker, Zusmarshausen-Wollbach, Germany

[73] Assignee: Wesumat Fahrzeugwaschanlagen GmbH, Augsburg, Germany

[21] Appl. No.: 09/520,286

[22] Filed: Mar. 7, 2000

Related U.S. Application Data

[62] Division of application No. 09/189,167, Nov. 9, 1998.

[30] Foreign Application Priority Data

Nov. 18, 1997 [DE] Germany ............................ 197 51 016

[51] Int. Cl.⁷ ........................................................ B60S 3/06
[52] U.S. Cl. ........................ 15/53.2; 15/53.4; 15/DIG. 2
[58] Field of Search ..................................... 15/53.1–53.4, 15/97.3, DIG. 2

[56] References Cited

U.S. PATENT DOCUMENTS

| | | | |
|---|---|---|---|
| 2,879,529 | 3/1959 | Piper ........................................... | 15/53.2 |
| 3,758,906 | 9/1973 | Takeuchi ..................................... | 15/53.2 |
| 4,450,600 | 5/1984 | Shelstad ...................................... | 15/53.2 |
| 4,593,425 | 6/1986 | Bivens ........................................ | 15/53.3 |
| 4,777,688 | 10/1988 | Seamster, Jr. .............................. | 15/53.2 |

FOREIGN PATENT DOCUMENTS

| | | |
|---|---|---|
| 2 231 846 | 2/1974 | Germany . |
| 36 16 817 | 5/1986 | Germany . |
| 195 27 828 | 2/1997 | Germany . |
| 2190341 | 11/1987 | United Kingdom ..................... 15/53.2 |

Primary Examiner—Mark Spisich
Attorney, Agent, or Firm—Flynn, Thiel, Boutell & Tanis, P.C.

[57] ABSTRACT

In this method for washing motor vehicles in a gantry-type washing installation with two movable gantries, washing is performed with a single pair of vertical brushes which wash between two horizontal brushes and are located on one of the two gantries. During a forward movement of the gantries, the washing process is commenced with the first horizontal brush in the front third of the vehicle, while the nose is washed with the two vertical brushes. Then the nose and the top of the vehicle approximately up to the rear third of the vehicle are washed with the second horizontal brush. The direction of travel of the gantries is reversed as soon as the tail wash has been executed with the two vertical brushes and before the second horizontal brush has reached the tail of the vehicle. During the return movement of the two gantries washing with the brushes is continued until the vertical brushes have passed the nose of the vehicle and the first gantry is then stopped while the first horizontal brush is still in the area above the first third of the vehicle. The washing time is thus shortened and the space requirement is reduced.

8 Claims, 3 Drawing Sheets

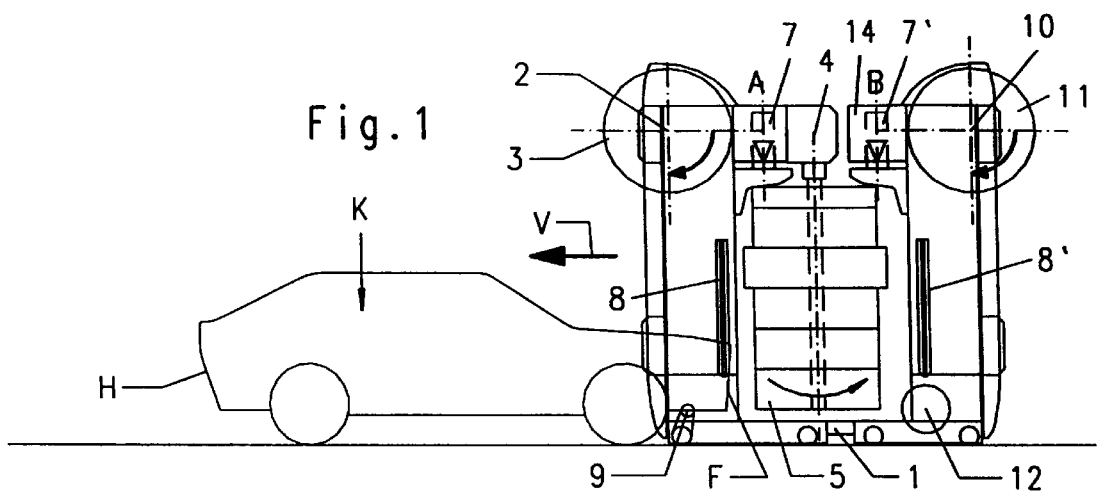
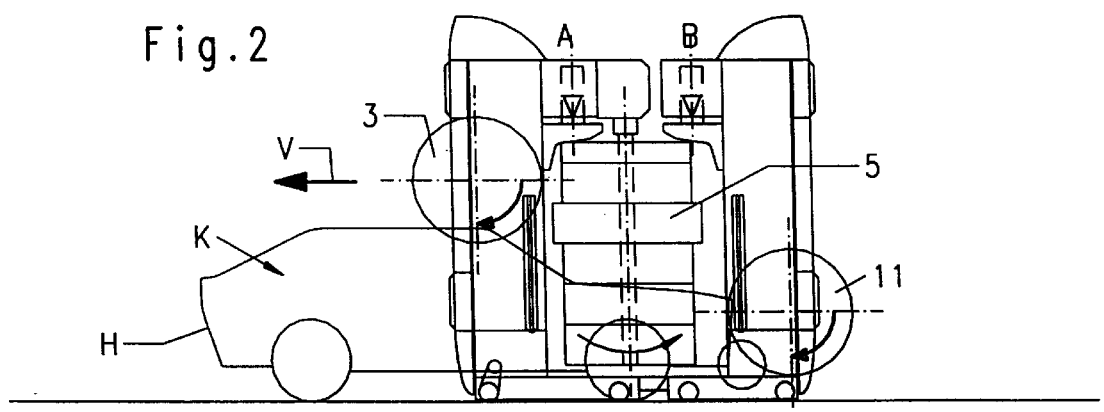
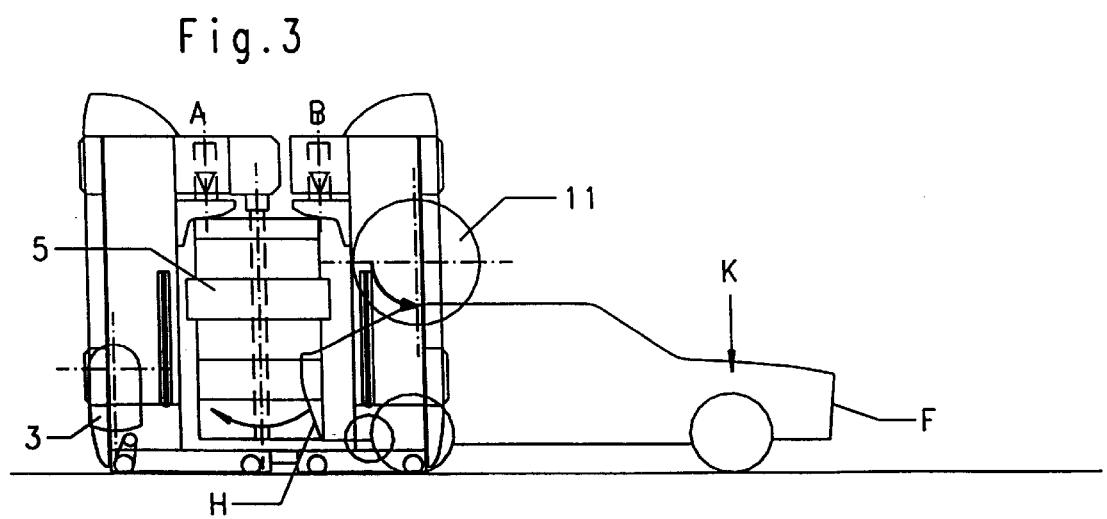

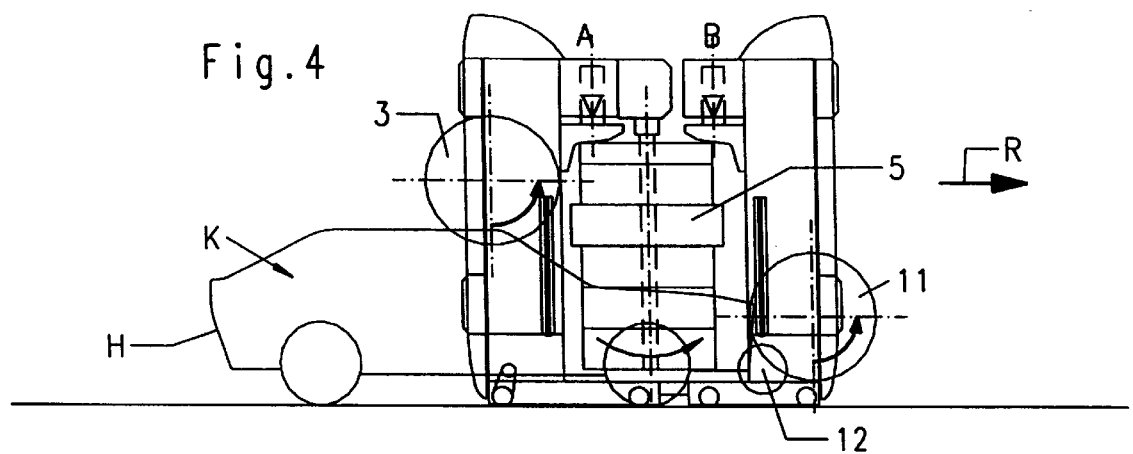
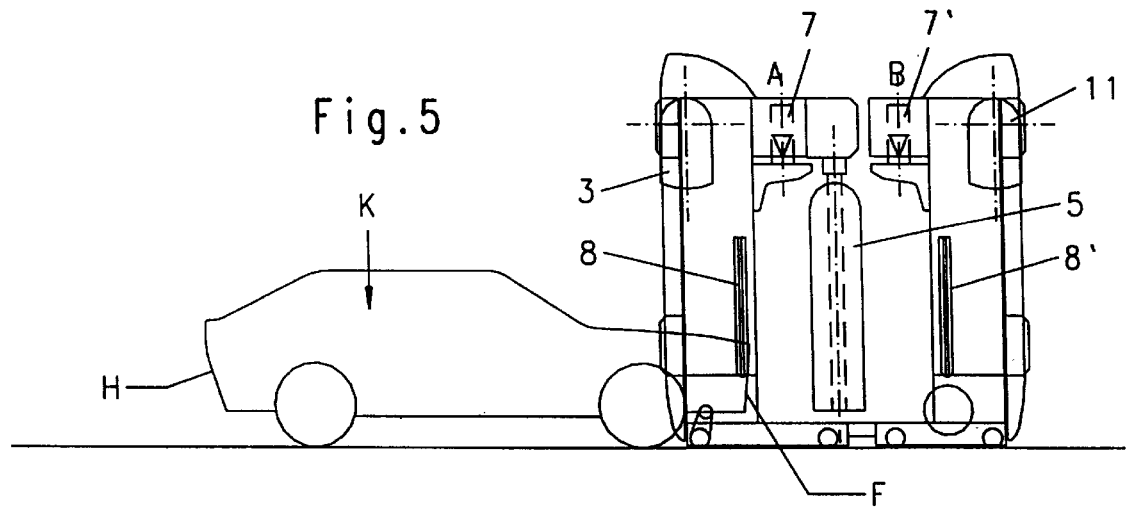
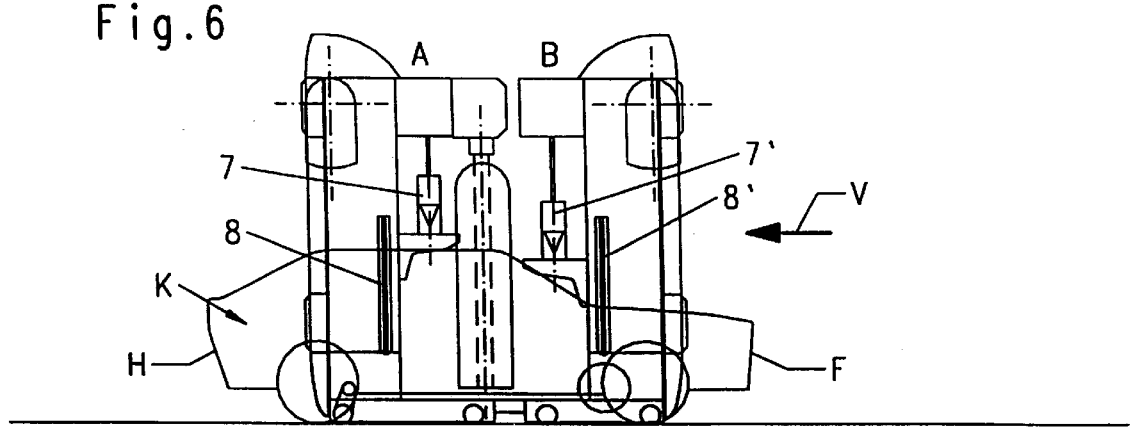

GANTRY-TYPE WASHING INSTALLATION FOR WASHING MOTOR VEHICLE

This is a division of U.S. Ser. No. 09/189 167, filed Nov. 9, 1998.

The invention relates to a method for washing motor vehicles with washing of the roof and sides ir a gantry-type washing installation with two movable gantries, each of which includes a washing brush rotating about a horizontal axis (=horizontal washing brush), and with washing brushes rotating about vertical axes (=vertical washing brushes). The invention also relates to a gantry-type washing installation for motor vehicles with two movable gantries, each of which includes a washing brush rotating about a horizontal axis (=horizontal brush), and with washing brushes rotating about vertical axes (=vertical brushes).

In the case of known gantry-type washing installations with two gantries which may be separately movable or may be coupled together (cf. DE 36 16 817 C1), in general a horizontal brush and a pair of vertical brushes are located on each of the two gantries. These gantry-type washing installations, which are designed for a high hourly vehicle throughput, need, however, a relatively large amount of space, for in addition to the length of the vehicle, a holding space corresponding to the length of the two gantries is required in front of or behind the vehicle. Because of the large space requirement, the known gantry-type washing installations with two gantries are not suitable for installation in the petrol companies' standard washing bays. Although gantry-type washing installations with only one gantry need less space, they have a low washing capacity.

The object of the invention is therefore to provide a method and also a gantry-type washing installation for washing motor vehicles of the above-mentioned kind which require less space than known gantry-type washing installations with two gantries, but enable a high vehicle throughput.

Proceeding from a method of the above-mentioned kind, the method as per the invention is characterised in that washing is performed, apart from with the two horizontal brushes, with a single pair of vertical brushes which wash between the two horizontal brushes and are located on one of the two gantries, that during a forward movement of the gantries the washing process is commenced with the first horizontal brush in the front third of the vehicle, while the nose is washed with the two vertical brushes, that then the nose and the top of the vehicle approximately up to the rear third of the vehicle are washed with the second horizontal brush, that the direction of travel of the gantries is reversed as soon as the tail wash has been executed with the two vertical brushes and before the second horizontal brush has reached the tail of the vehicle, that during the return movement of the two gantries washing with the brushes is continued until the vertical brushes have passed the nose of the vehicle and that the first gantry is then stopped while the first horizontal brush is still in the area above the first third of the vehicle.

Proceeding from a gantry-type washing installation for vehicles of the above-mentioned kind, the invention provides that the gantry-type washing installation includes a single pair of vertical brushes which are located between the two horizontal brushes on one of the two gantries and that the gantry-type washing installation comprises a control device which switches the gantries from forward to return movement before the second horizontal brush has reached the tail of the vehicle and which terminates the return movement of the gantries as soon as the vertical brushes have passed the nose of the vehicle and the first horizontal brush is still in the area above the first third of the vehicle.

The invention is therefore based on the idea that during both the forward movement and the return movement of the gantries, the two gantries are not moved beyond the full length of the vehicle, but each gantry movement is terminated when one of the two roof brushes is still in the area above the front or, respectively, rear third of the vehicle. By this means and through the use of only one pair of vertical brushes located between the horizontal brushes, the gantry-type washing installation requires, in addition to the length of the vehicle, only the installed length of a single gantry in front of and behind the vehicle. The method as per the invention can therefore be executed, and the gantry-type washing installation as per the invention erected, in the petrol companies' standard washing bays, in which there is otherwise only enough space for a gantry-type washing installation with a single gantry.

As the washing operation is commenced with the first horizontal brush while it is already in the region of the front third of the vehicle approximately in the middle of the bonnet, as the direction of travel of the gantries is reversed before the second horizontal brush has reached the tail of the vehicle, and as during the return movement of the gantries the first gantry is stopped while the first horizontal brush is still in the region above the first third of the vehicle, a considerable shortening of the gantries' travelling distances is achieved, leading to a shortening of the washing time and hence a higher hourly vehicle throughput.

Figure 8:
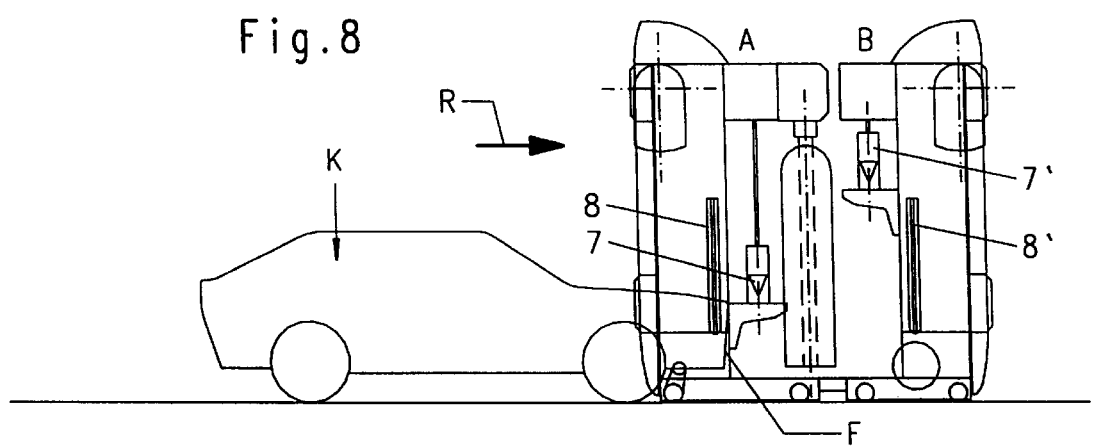
Figure 9:
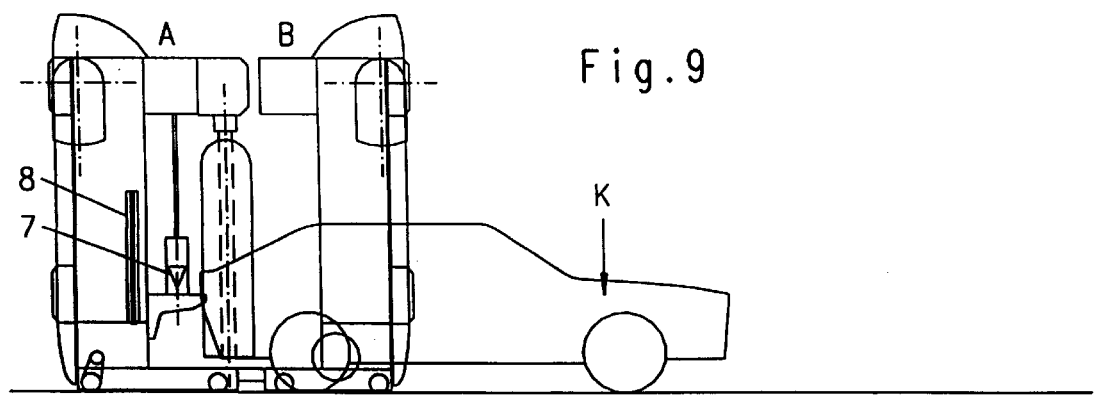

Advantageous developments of the invention are characterised in the dependent claims. The invention is explained in more detail in the following with reference to example embodiments illustrated in the drawing, wherein:

FIGS. 1–5 depict various positions of the gantries from the beginning to the end of the washing process, FIGS. 6–8 depict various positions of the gantries during the drying process with two drying devices, FIG. 9 depicts the reversal position of the gantries during the drying process with one drying device.

The gantry-type washing installation illustrated in the drawing is equipped with two movable gantries A and B. The two gantries A, B are preferably coupled together; this may for example be accomplished by means of a coupling rod 1 provided on each side of the gantry. Optionally, gantries A, B could be individually movable, but the coupled design is preferable because this leads to considerable simplifications in the case of one of the two gantries. Gantry A, which is referred to in the following as the first gantry, is a fully equipped gantry with a washing brush 3 rotating about a horizontal axis 2; this washing brush is referred to as the horizontal brush or roof brush and is height-adjustably located in the first gantry A. The first gantry A also comprises a pair of washing brushes 5 rotating about vertical axes 4, which are referred to as vertical brushes or side brushes and are movably supported in the first gantry A transversely to the latter's direction of travel. The vertical brushes 5 are located on the side of the first gantry A which faces the second gantry B. The first gantry also comprises a drying device, of which, however, only the height-adjustable horizontal nozzle 7, also referred to as "roof nozzle", and a vertical nozzle 8, also referred to as "side nozzle", are illustrated in the drawing. In reality, there are two vertical nozzles 8 in gantry A, one for each side, which are located on gantry A in a stationary or a laterally adjustable manner. For driving the first gantry A, a drive motor 9 is provided on each side of the gantry. On the first gantry A as well as on the second gantry, application devices (not illustrated) for detergent, rinse agent, drying agent and/or preserving agent may be provided as well as, optionally, an underbody washing device and/or a high pressure washing device. The complete control system for the gantry-type washing installation as well as the water distribution, the feed pumps and further devices are also incorporated in the first gantry A.

The second gantry B comprises a second horizontal brush 11 rotating about a horizontal axis 10, but no vertical brushes. The second gantry B may moreover be equipped with a complete drying device, of which only the horizontal nozzle 7' and the vertical nozzle 8' are illustrated. In addition, a wheel washing device 12 may be located on the second gantry B. On movement of the first gantry A, the second gantry B is carried with it by means of the coupling rods 1. A control system, drive motor and the like are not required for the second gantry B. The second gantry B can be supplied with water, detergent, rinse agent, preserving agent, etc. from the first gantry. Optionally, it would also be conceivable for the two gantries A and B to be combined into a single gantry. However, the separated configuration of gantries A and B illustrated in the drawing is preferable, because then the first gantry A is a standard gantry and the second gantry B can mainly be constructed using the same components and sub-assemblies that are used for gantry A. Moreover, the separated configuration also has the advantage that an existing gantry-type washing installation with only one gantry can be retrofitted by attaching the second gantry B, and that the capacity of an existing gantry-type washing installation with only one gantry can hence be increased substantially without more space being required for moving and parking the two gantries, as a result of the invention.

Optionally, a drying device on the second gantry B can be dispensed with, as illustrated in FIG. 9.

The two gantries A and B could optionally be transposed, so that gantry B as per the drawings would be on the left and form the first gantry, while gantry A would be on the right and form the second gantry. However, the two gantries would each have to be turned through 180° so as to ensure that in this case, too, the two vertical brushes 5 are located between the horizontal brushes 3 and 11, for only in this way is it possible to accommodate the two gantries A and B in a space-saving manner. Similarly, the horizontal nozzles 7 and 7' should be located on the mutually facing sides of the two gantries A, B, i.e. between the two horizontal brushes 3, 11.

By means of the gantry-type washing installation described, the washing and drying of a motor vehicle K is accomplished as follows:

In FIG. 1 the two gantries A, B are shown in their starting position. The first gantry A is positioned such that its vertical brushes 5 are in front of the nose F of the vehicle and its horizontal brush 3 is above the front third of the motor vehicle K. In this position of the first gantry A, the brushes 5, 3 are set in rotation and the vertical brushes 5 first wash the nose F of the vehicle. The first horizontal brush 3 is lowered onto the bonnet of vehicle K. As soon as the two vertical brushes have reached the two front corners of the vehicle, the two gantries A and B are set in motion in the direction of the arrow V and execute a forward movement. The first horizontal brush 3 now commences the washing process approximately in the middle of the bonnet. The horizontal brush 11 in the second gantry B is now lowered as well. As the two gantries A, B continue to move in the direction V, as illustrated in FIG. 2, this brush comes in contact with the nose of the vehicle and washes it a second time. As the two gantries continue to move forwards in the direction V, the parts of the bonnet that were not washed by the first horizontal brush 3 are then washed by the second horizontal brush 11, while horizontal brush 3 washes the roof section and the vertical brushes 5 wash the sides of the vehicle. When the vertical brushes 5 have reached the tail of the vehicle, they move toward each other to the middle of the vehicle and wash the tail H of the vehicle. In doing so, they also perform a "centre overlap". During washing of the tail, both gantries A, B are at rest. The second horizontal brush 11 washes only up to the end of the roof or up to the rear windscreen, depending on the vehicle type. It does not reach the tail H of the vehicle. In this way it is achieved that in the reversal position of gantries A, B illustrated in FIG. 3 only the first gantry A needs space behind the vehicle K. When the vertical brushes 5 have performed the centre overlap, they are moved outwards again in opposite directions, washing the tail of the vehicle a second time. When they have reached the two rear corners of the vehicle, the control device switches to return movement and both gantries A, B are moved in the direction R, the first gantry A pushing the second gantry B before it. The first roof brush 3 then washes the tail H of the vehicle a third time, and then the horizontal brush 3 also washes the rear windscreen and the roof or part thereof. The second horizontal brush 11 washes the roof, the front windscreen and the bonnet. The sides of the vehicle are washed a second time by the vertical brushes 5 during the return movement in the direction R. When gantries A, B have been moved back so far that the first horizontal brush 3 has reached the front section of the roof and the second washing brush 11 has reached the front end of the bonnet, both horizontal brushes 3, 11 can be raised up as illustrated in FIG. 4. The vertical brushes 5 then finish washing the sides of vehicle K. When the vertical brushes 5 have moved past the nose F of the vehicle, the control device stops both gantries. They then assume the position illustrated in FIG. 5, with the horizontal washing brush above the front third of the vehicle and about half the first gantry A still in the region of the vehicle K. The remaining part of the first gantry A and also the second gantry B are in front of the nose F of the vehicle and together occupy as much space in front of the vehicle K as a normal gantry fully equipped with a horizontal brush and vertical brushes would take up. As the second gantry B has no vertical brushes and the rotating vertical brushes 5 of the first gantry can engage below the transom 14 of the second gantry B, as illustrated in FIG. 1, the space required by the second gantry B lengthways to the vehicle corresponds to only about one half of a fully equipped gantry. Because the first washing brush 3 only commences the washing process approximately in the middle of the bonnet and the second washing brush 11 is only moved up to the rear section of the vehicle's roof, the travelling distance of both gantries A, B is shortened, as is therefore the total time required for forward and return movement. Hence the hourly vehicle throughput can be increased.

Without significantly extending the vehicle washing time, an underbody wash may optionally also be executed during the forward movement of the gantries and a wheel wash executed with the wheel washing device 12 during the return movement. If, however, the two gantries A, B are rigidly coupled together, they have to be stopped briefly during wheel washing. It is also possible to apply wax polish and/or underbody wax during the return movement.

To achieve a particularly good drying effect, the two gantries A, B are each expediently equipped with complete drying devices. Proceeding from the final position of both gantries, illustrated in FIG. 5, which they assume on completion of the washing process, the drying devices are started up and both gantries are again moved at increased speed in a further forward movement until the first horizontal nozzle 7 of the first gantry A has approximately reached the middle of the vehicle, as illustrated in FIG. 6. Both gantries are then maintained in forward movement at normal speed until the first horizontal nozzle 7 has dried the tail of the vehicle, as illustrated in FIG. 7. The control device then switches both gantries A, B to return movement in the direction R and drying is continued until the first horizontal nozzle is again in front of the vehicle's nose F as shown in FIG. 8. Both gantries A, B are then stopped and both horizontal nozzles 7, 7' are moved upwards, so that gantries A, B again assume their initial position as shown in FIG. 1. The forward movement of both gantries A, B at increased speed saves time without adversely affecting the drying results, for while the gantries are moving forwards up to the vehicle's tail and then moving back again, most of the water on the bonnet can run off, so that here a single drying operation with the horizontal nozzles 7, 7' and the vertical nozzles 8, 8' is sufficient. A further time saving is achieved by the gantries being switched to return movement before the second horizontal nozzle 7' has reached the vehicle's tail. If it is desired to apply foam wax, it may be applied by the first gantry A during the second forward movement of the gantries, while the second gantry B performs the rinsing. Drying of the vehicle then takes place only during the second return movement of the gantries, which means that a "luxury wash" with foam wax and optionally underbody care can be executed in only two forward and two return movements of the gantries, a shortening of the treatment time being achieved by the previously described shortening of the travelling distances of the gantries.

It will be appreciated that with the new gantry-type washing installation more complex washing and preservation programmes, e.g. chemical pre-wash, special wheel wash, foam application, high pressure wash, etc. can also be executed; for this, however, a further forward movement and a further return movement of both gantries are necessary.

What is claimed is:

1. In a washing installation for motor vehicles, with two movable gantries, each of which includes a horizontal washing brush rotating about a horizontal axis, and with vertical washing brushes rotating about vertical axes, the improvement wherein the washing installation includes a single pair of vertical washing brushes which are located between the two horizontal washing brushes on one of the two gantries, and wherein the washing installation comprises a control device which switches the gantries from forward to return movement before the second horizontal washing brush has reached a tail of the vehicle and which terminates the return movement of the gantries as soon as the vertical washing brushes have passed a nose of the vehicle and the first horizontal washing brush is still in the area above the first third of the vehicle.

2. The washing installation as claimed in claim 1, wherein the vertical washing brushes are located on the first gantry, with the horizontal brush of which the washing process is commenced.

3. The washing installation as claimed in claim 1, wherein a wheel washing device is located on the second gantry.

4. The washing installation as claimed in claim 1, wherein the two gantries are coupled together and the control device, a water distribution means and feed pumps for both gantries are located in one of the latter.

5. The washing installation as claimed in claim 1, wherein a complete drying device with a horizontal nozzle and two vertical nozzles is provided on the first gantry.

6. The washing installation as claimed in claim 1, wherein a complete drying device is located on each of the two gantries, each drying device having a horizontal nozzle and two vertical nozzles.

7. The washing installation as claimed in claim 6, wherein the horizontal nozzles of the drying devices are located on the mutually facing sides of the two gantries.

8. The washing installation as claimed in claim 1, wherein application devices for detergent, rinse agent, drying agent and/or preserving agent are provided on the gantries.

* * * * *